United States Patent [19]

Metzger

[11] 3,928,570

[45] Dec. 23, 1975

[54] AMPHOTERICIN COMPLEXES

[75] Inventor: Julio Metzger, East Brunswick, N.J.

[73] Assignee: E. R. Squibb & Sons, Inc., Princeton, N.J.

[22] Filed: Dec. 28, 1973

[21] Appl. No.: 429,226

Related U.S. Application Data

[63] Continuation-in-part of Ser. No. 203,037, Nov. 29, 1971, abandoned.

[52] U.S. Cl. ............................................. 424/118
[51] Int. Cl.² ...................................... A61K 35/00
[58] Field of Search .................................. 424/118

[56] References Cited

UNITED STATES PATENTS 2,908,611   10/1959   Dutcher et al. ...................... 424/119

*Primary Examiner*—Jerome D. Goldberg
*Attorney, Agent, or Firm*—Lawrence S. Levinson; Merle J. Smith; Burton Rodney

[57] ABSTRACT

This invention relates to a new complex of amphotericin B and calcium. This new form of amphotericin retains the activity of amphotericin and has the particular advantage of being soluble in acidic or alkaline solutions and stable both in the dry form and in solution.

1 Claim, 1 Drawing Figure

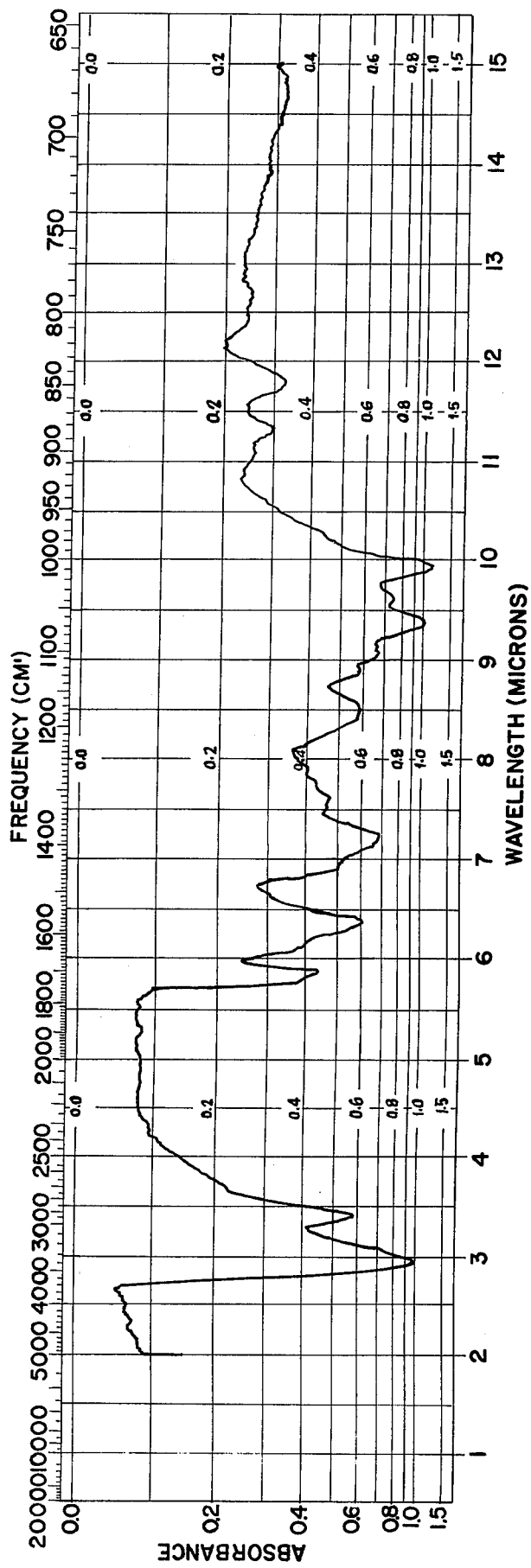

3,928,570

AMPHOTERICIN COMPLEXES

RELATED APPLICATION

This application is a continuation-in-part of copending application Ser. No. 203,037 filed Nov. 29, 1971 now abandoned.

BACKGROUND OF THE INVENTION

Amphotericin B is a polyene macrolide compound having antifungal properties. It is produced by cultivation of an organism and extracted from the culture. Amphotericin B is essentially a high molecular weight macrocyclic lactone, better known as a macrolide, possessing a chromophore of 7 conjugated double bonds. In addition to the large lactone nucleus, amphotericin B has other characteristic groups including an amino sugar. A general discussion of macrolide antibiotics is found in Kirk-Othmer, Encyclopedia of Chemical Technology, Second Edition, Volume 12, pp, 632 et seq., while a general discussion of polyene antibiotics is found in the same work, Volume 16, pp. 133 et seq.

While amphotericin B has been recognized as a valuable material, particularly in its powerful antifungal properties and in the apparent inability of fungus organisms to develop readily any strains or forms that are resistant to amphotericin B, its use has been limited by lack of adequate water solubility in forms of amphotericin B which are otherwise stable and appropriate.

OBJECTS OF THE INVENTION

It is, accordingly, an object of the present invention to provide a more soluble form of amphotericin B. Another object is to provide a form of amphotericin B which is stable both in dry form and in solution. A further object is to provide a method for preparing this new form of amphotericin B. These and other objects of the present invention will be apparent from the following description.

SUMMARY OF THE INVENTION

This invention relates to a new crystalline complex of amphotericin B and calcium. This new form of amphotericin retains the activity of amphotericin and has the particular advantage of being soluble in acidic or alkaline solutions and stable both in the dry form and in solution.

BRIEF DESCRIPTION OF THE DRAWING

The drawing is an infra-red spectrum of the amphotericin B-calcium complex of the present invention.

Detailed Description

This invention relates to a new more soluble form of amphotericin B which is a complex of amphotericin B and calcium ion. This type of stabilized, solubilized amphotericin B may be obtained by adding $Ca^{++}$ ion to a substantially anhydrous (not over about 1% water) alcoholic solution of amphotericin B. Methanol is a preferred alcohol although any water soluble or water miscible alcohol may be used. The calcium ion may be added in the form of a soluble salt such as, for example, $CaCl_2$. The calcium ion is present in a ratio of from about 0.2 to about 0.8 mol per mol of amphotericin B, preferably from about 0.2 to about 0.5 mol per mol of amphotericin B, and most preferably at about 0.25 mol per mol of amphotericin B. The mixture of amphotericin B and calcium ion is agitated for a short time, typically from about 2 minutes to about 30 minutes, and the pH then adjusted to neutral. The mixture is then heated moderately to from about 35°C to about 65°C while mixing for a period of from about 0.5 to about 2 hours. The pH is then readjusted to neutral and the mixture cooled slowly over a period of from about 0.5 to about 4 hours. The crystalline solid is filtered and dried.

The calcium complex of amphotericin B retains the antifungal activity of amphotericin B, is stable in the dry form and is soluble in water. A particular advantage of the calcium complex is that it permits the preparation of more concentrated aqueous solutions in the range of from about 2 g to about 5 g per liter. Such concentrated aqueous solutions may be used, for example, to control fungal growths in the digestive tract of fowl by supplying it to the drinking water.

Unlike prior art calcium chloride complexes of amphotericin B which are amorphous and which contain chloride ion, the amphotericin B complex of the present invention is crystalline and free of chloride ion. The complex of the present invention is soluble in water under both strongly acid and strongly alkaline conditions while exhibiting diminished solubility at neutral or near neutral pH. Maximum solubility of the amphotericin B complexes of the present invention occur at two pH values, at about pH 2 and at about pH 10. At about pH 2 the complex of the present invention has a solubility in water of over 2 g/l wherein amphotericin B has a solubility in water at pH 2 of less than 1 g/l. The complex of the present invention is less soluble in methanol than amphotericin B. For example, only about 17.2 mg of the complex of the present invention are soluble in 80 ml of methanol at pH 9.5 (with triethyl amine) whereas 100 mg of amphotericin B are completely soluble under the same conditions.

The infra-red adsorption spectrum of the amphotericin B calcium complex of the present invention is reproduced in the accompanying drawing. This spectrum shows peaks at 3.0, 3.45, 5.87, 6.4, 7.2, 7.6, 8.5, 8.88, 9.07, 9.38, 9.65, 9.93, 11.35, and 11.80 microns. The X-ray diffraction pattern of this complex shows $d$ values at the following peaks: 2.80, 2.92, 3.14, 3.35, 3.47, 3.62, 3.80, 3.90, 4.13, 4.52, 4.74, 5.00, 5.48, 5.72, 6.02, 6.41, 7.37, 7.75, 9.11 and 18.4. The $d$ value at 4.13 has a relative intensity of 100%, that at 4.74 has a relative intensity of 63.6% and that at 18.4 has a relative intensity of 72.7%. The X-ray diffraction pattern of amphotericin B, on the other hand, shows the following peaks: 2.22, 2.76, 2.91, 3.20, 3.27, 3.33, 3.48, 3.74, 3.86, 4.07, 4.24, 4.39, 4.71, 5.09, 5.78, 6.23, 7.31, 7.68, 9.20 and 18.80. The $d$ value at 6.23 has a relative intensity of 100%, that at 4.07 has a relative intensity of 94%, and that at 5.09 has a relative intensity of 44%.

The complex of the present invention shows the following elemental analysis: C, about 52–53%; H, about 7%; N, about 1.5–1.75%; O, about 37–38%; and Ca, about 1%.

The following example illustrates the present invention without, however, limiting the same thereto. All temperatures in the application are expressed in degrees Centigrade unless otherwise indicated.

EXAMPLE 1

Amphotericin B - Calcium Complex 184.0 g of crude amphotericin B mycelial powder containing 9.0 g of activity and 0.85% calcium are solubilized in 3.6 l. of anhydrous methanol with 11.0 ml of 5.8 N HCl at pH 4.0. Solids are filtered off and the pH of the filtrate adjusted to pH 7.0 with 5.0 ml of concentrated ammonia. The crystal suspension which forms is heated to 45°–50°C, slurried for 60 minutes, cooled to room temperature over a two hour period, filtered and dried overnight at 45°–50°C. The crystalline complex weighs 8.41 g and has a calcium content of about 1%. It is free of chlorine. This complex has a solubility in water of about 5.2 g/l. at pH 2.0. Amphotericin B on the other hand, has a solubility in water of less than 1 g/l. at pH 2.0. This complex is soluble in methanol at pH 9.5 (with triethyl amine) to the extent of only about 0.2 g/l. whereas amphotericin B exceeds a solubility of 1.25 g/l. under the same conditions.

The crystalline complex has the following elemental analysis: C 52.55%, H 7.25%, N 1.64%, O 37.64%, and Ca 0.92%.

What is claimed is:

1. A complex comprising amphotericin B and calcium ion in a ratio of about 1 mole of amphotericin B to about 0.25 mole of calcium ion, the complex being crystalline and substantially free of chlorine, and having a solubility in water of over 2 grams per liter at about pH 2, having an infra-red spectrum showing peaks at about 3.0, 3.45, 5.87, 6.4, 7.2, 8.5, 8.88, 9.07, 9.38, 9.65, 9.93, 11.35 and 11.80 microns, and having the following elemental analysis: C, 52.55%; H, 7.25%; N, 1.64%; O, 37.64%; and Ca, 0.92%.

* * * * *